Figure 1:
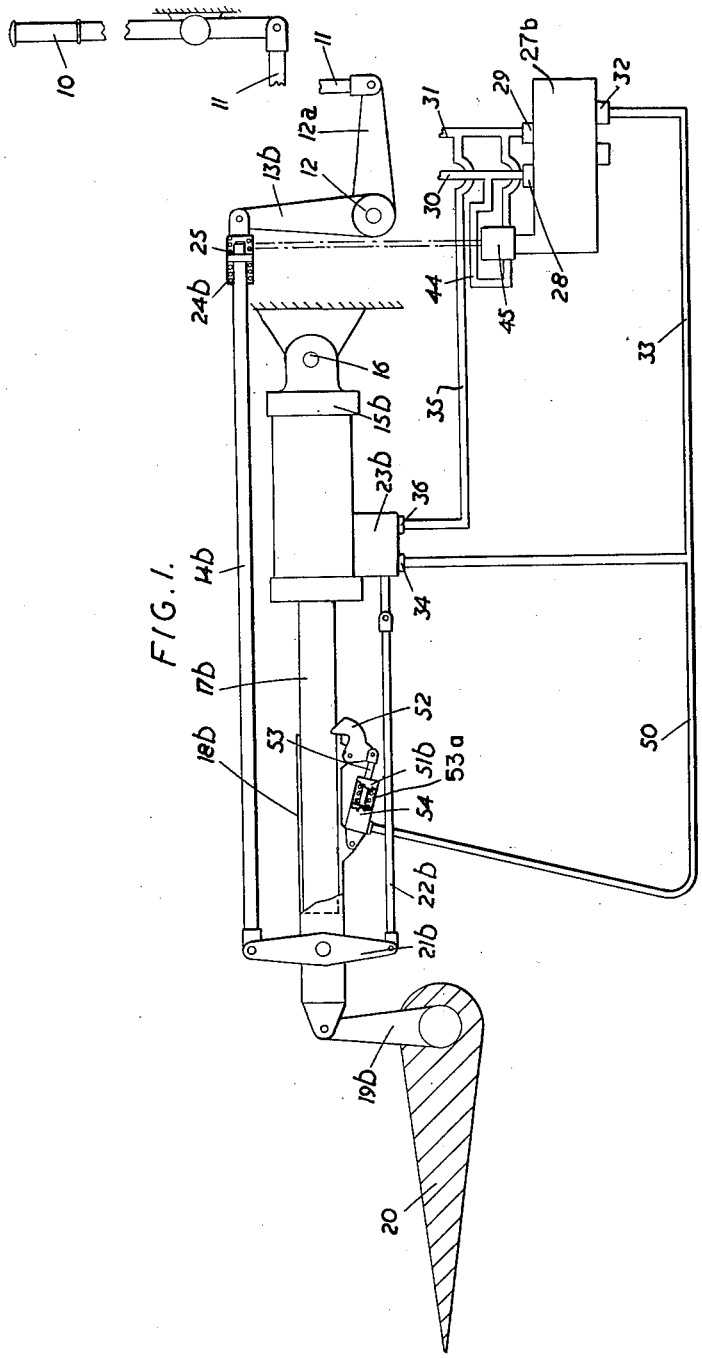

March 25, 1952 — W. G. LISLE — 2,590,716

POWER-OPERATED FLYING CONTROL SYSTEM FOR AIRCRAFT

Filed Aug. 18, 1948 — 4 Sheets-Sheet 1

WILLIAM GEORGE LISLE
Inventor

March 25, 1952 W. G. LISLE 2,590,716
POWER-OPERATED FLYING CONTROL SYSTEM FOR AIRCRAFT
Filed Aug. 18, 1948 4 Sheets-Sheet 2

WILLIAM GEORGE LISLE
Inventor
By Roberts B. Larson
Attorney

March 25, 1952 W. G. LISLE 2,590,716
POWER-OPERATED FLYING CONTROL SYSTEM FOR AIRCRAFT
Filed Aug. 18, 1948 4 Sheets-Sheet 3

INVENTOR
WILLIAM GEORGE LISLE
By
Robert B. Larson
ATTORNEY

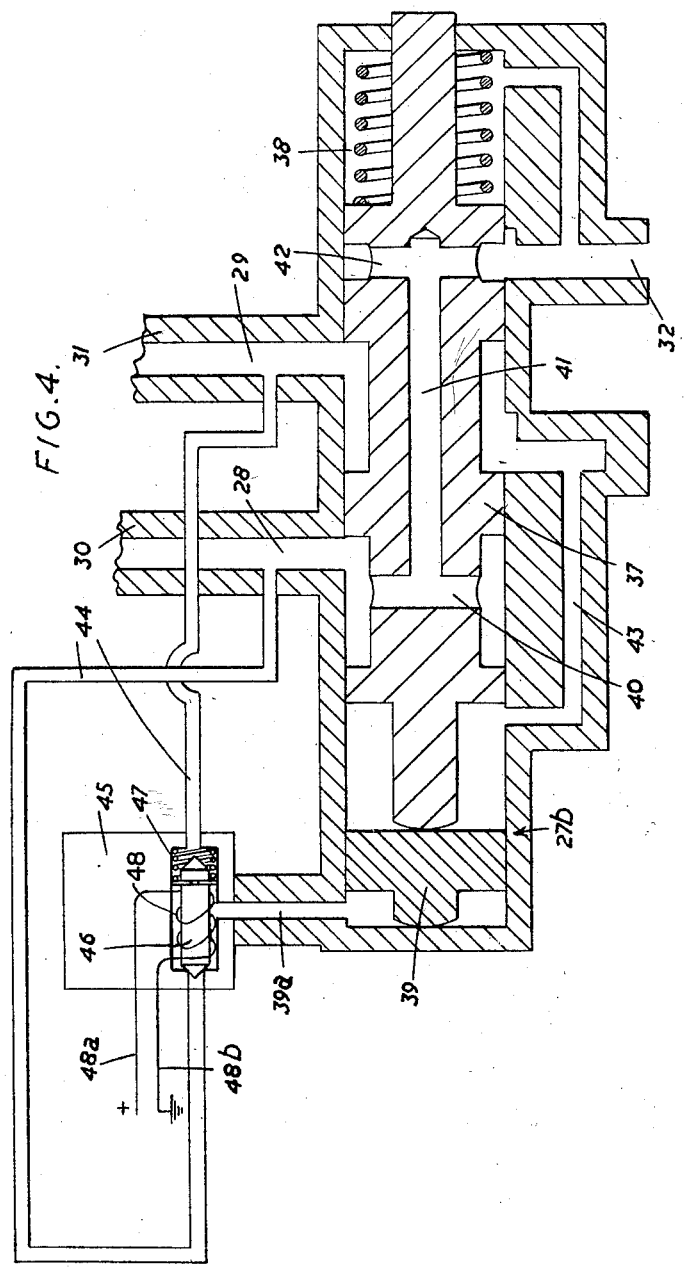

Patented Mar. 25, 1952

2,590,716

UNITED STATES PATENT OFFICE 2,590,716

POWER-OPERATED FLYING CONTROL SYSTEM FOR AIRCRAFT

William George Lisle, East Bedfont, England, assignor to The Fairey Aviation Company Limited, Hayes, England Application August 18, 1948, Serial No. 44,875
In Great Britain August 26, 1947

6 Claims. (Cl. 60—97)

This invention relates to power-operated flying control systems for aircraft, and especially for very large aircraft, where it is necessary to have recourse to power-operation of the flying controls under all conditions of flight. It will be obvious that in such aircraft considerations of safety call for the duplication of the power-operating means, and these duplicated means must be independent of one another.

In the event of an emergency, such as the failure of hydraulic power, or the mechanical seizure of a component such as a hydraulic jack, it will be necessary (e. g. in the case of failure of the hydraulic pressure) to ensure not only that the control surface can be actuated by a power-operating means which is unaffected by the factors giving rise to the emergency, but also (e. g. in the case of a seized jack) that the power-operating means which has been affected is disconnected from the control surface, as otherwise the control system might become locked by the affected member and so would be inoperative.

It is an object of the invention to provide a control system which will obviate this possibility, and will ensure not only that the power-operating means are duplicated and independent of one another, but that failure of one will not prevent the operation of the other.

According to the present invention a power-operated flying control system for an aircraft has duplicated independent servo means connected on the one hand with a pilot's control and on the other hand releasably with the control surface to be actuated, the arrangement being such that normally actuation of the control surface is performed by both servo means conjointly, but in case of emergency (e. g. mechanical failure of a servo means), one of the servo means can be released and the control surface can be actuated by the other servo means.

The duplicated servo means may each be constituted by a hydraulic jack having its own independent source of fluid pressure and connected with a linkage for operation by the pilot's control and with means to actuate the control surface by a releasable lock normally held in its locked position by the fluid pressure and arranged to be unlocked, and so to disconnect the jack from the control surface, when the fluid pressure is cut off or fails.

Each independent hydraulic circuit may be provided with a valve arranged to be operated by an abnormal load on the servo means to cut off the pressure fluid therefor. This valve may be a two-way solenoid-operated valve controlled by a micro-switch arranged to respond to the abnormal load, and by a second switch in series with the micro-switch and under the control of the pilot.

Preferably the solenoid-operated valve is arranged to be held locked after it has cut off the pressure fluid, so preventing accidental engagement or operation of the deranged servo means.

The valve may be a two-way solenoid-operated valve controlled by one or a pair of micro-switches arranged that when a permissive valve operating load is exceeded they automatically operate the solenoid.

Instead of an electrically operated valve, there may be provided a valve mechanically operated by a trip mechanism connected with the linkage between the pilot's control and the hydraulic jack.

Figure 2:
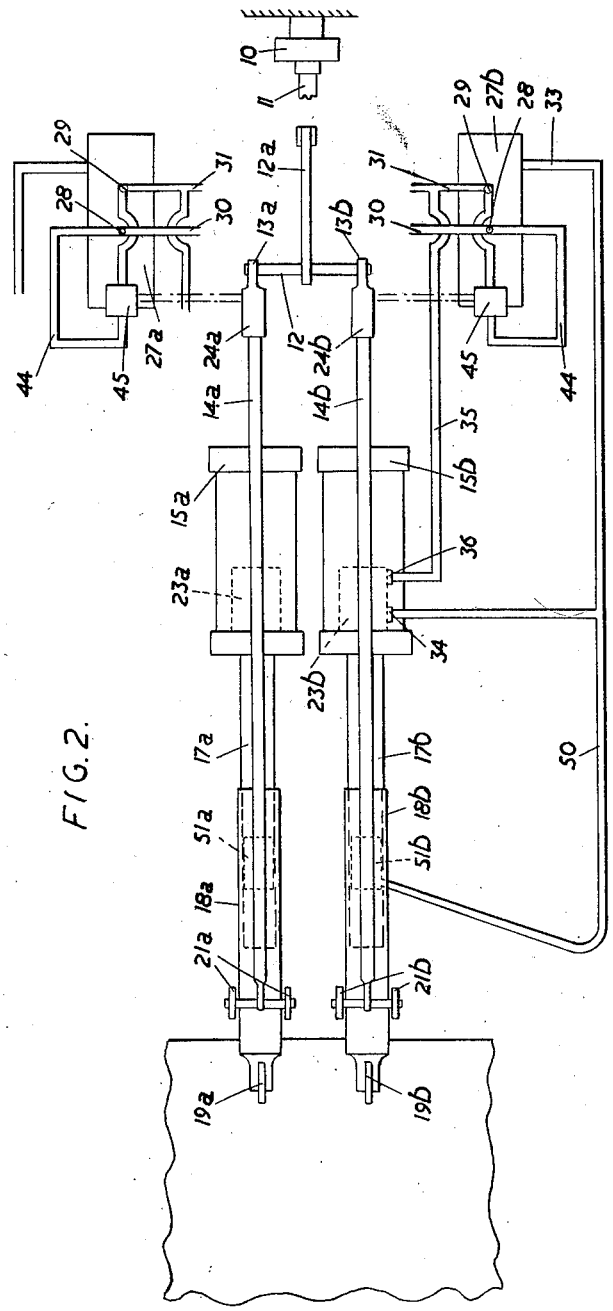
Figure 6:
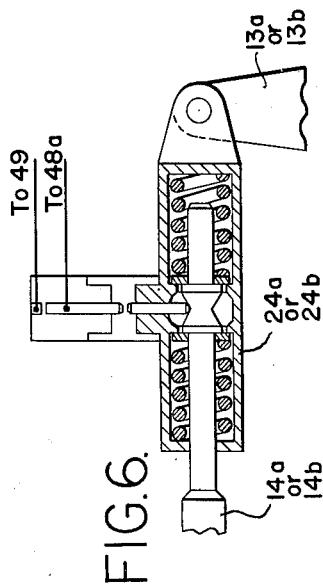
Figure 5:
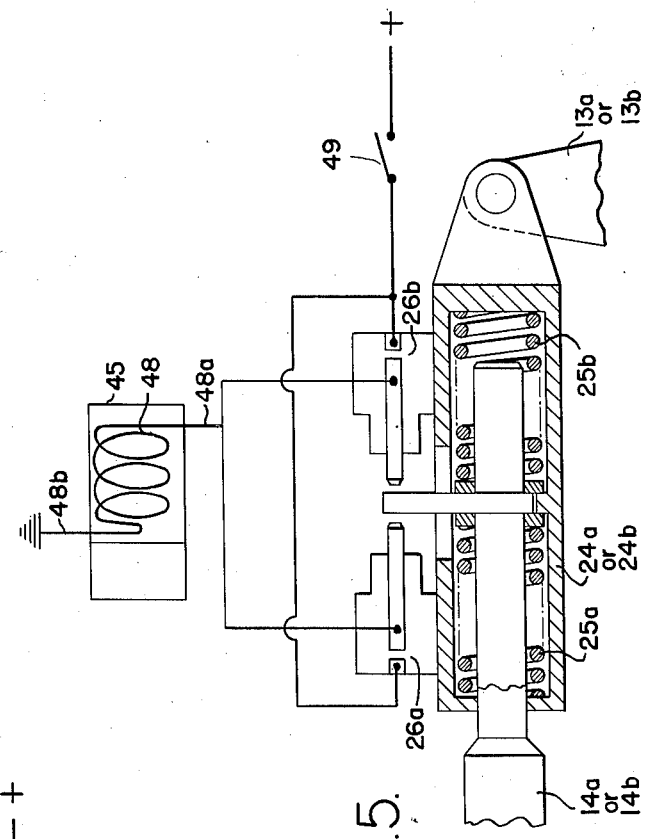
Figure 3:
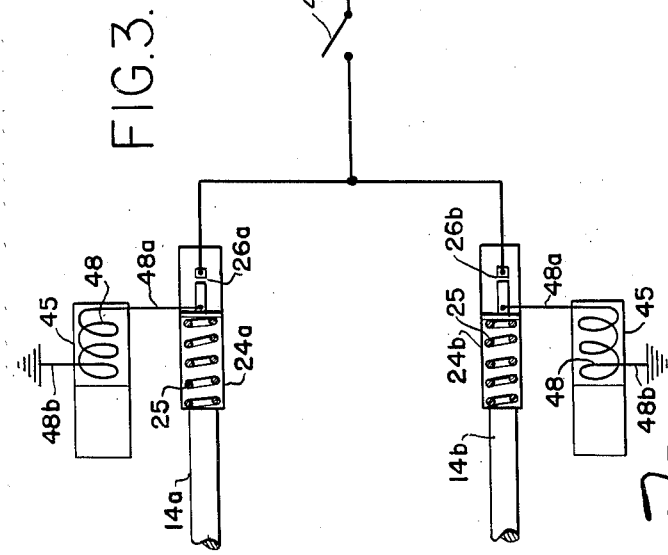

The invention will be described with reference to the accompanying drawings, in which:

Figure 1 is a diagrammatic representation of a flying control system in side elevation, Figure 2 is a diagrammatic representation of the system in plan, Figure 3 is a fragmentary diagrammatic representation in plan of part of the system, Figure 4 is a diagrammatic sectional elevation of a solenoid-operated valve, and Figs. 5 and 6 show one and two micro-switches, respectively, for controlling and operating the solenoid arrangement.

Referring to Figures 1 to 4, a pilot's control 10 is connected with a linkage 11 which terminates at an operating rod 12 pivotally mounted on the aircraft structure and having a single arm 12a with which the linkage 11 is connected and double arms 13a, 13b with which are connected links 14a, 14b associated respectively with duplicated servo means, this operating rod 12, which may be termed a "separating" lever, constituting the point at which duplication of the system begins. As the duplicated components are identical, consideration of the details of only one side of the system will be sufficient.

The body 15b of a hydraulic jack is pivotally mounted on the aircraft at 16, and the piston thereof has a piston rod 17b arranged with its free end received slidably in one end of a sleeve 18b the other end of said sleeve being pivotally secured to a lever arm 19b to actuate the control surface 20. Mounted pivotally on this sleeve 18b and intermediate its length is a divided lever 21b connected on one side with a link 22b to operate a jack selector valve 23b on the jack cylinder 15b and on the other side with the link 14b which is connected, through a spring box 24b, with the end of one of the double arms 13b of the operating rod 12. The spring box 24b is arranged, by compression of its spring 25 when an abnormal load is imposed between the operating rod 12 and this link 14b, to operate a micro-switch 26b controlling a solenoid-operated self-locking two-way valve 27b. This valve has a port 28, connected with the pressure line 30, another port 29 being connected with the return line 31 of the hydraulic system of which the jack forms a part, and a third port 32 being connected by a pipe 33 with the port 34 of the jack selector valve 23b, while the return line 31 of the system has a branch 35 connected with the other port 36 of the selector valve 23b.

The solenoid-operated self-locking two-way valve 27b has a piston 37 axially movable in the valve body against a spring 38, and a free piston 39. The piston 37 is formed with passages 40, 41, 42, and the valve body is formed with a passage 43. The pipes 30, 31 are connected by a branch 44 in which is a solenoid-valve 45 housing an armature 46 urged by a spring 47 to the position indicated in Figure 4. Windings 48 for the solenoids are connected with the micro-switches 26a, 26b (see Figure 3) by wires 48a, and to earth by wires 48b.

The solenoid-operated self-locking two-way valve 27b is so arranged that, when once operated to cut off the pressure fluid supplied through it to the servo means, the valve will become locked by reason of the said pressure fluid, so ensuring that the deranged servo means will not become re-engaged when the spring-box-operated micro-switch 26b and the pilot's hand-operated switch 49 open the electrical solenoid circuit.

As shown in Figure 4, the valve 27b is in the position it occupies during normal flight, the armature 46 being de-energized and urged by the spring 47 to close the solenoid valve 45 against pressure fluid from the pipe 30 via the branch 44. Hence the free piston 39 is not moved, and the piston 37 is held by its spring 38 to permit the pressure fluid from the pipe 30 to pass through the passages 40, 41, 42 to the port 32.

When the solenoid is energized to move the armature 46 to the right, the valve 45 is opened to the pressure fluid, which enters the passage 39a and moves the pistons 39, 37 to the right, thus closing the port 32 to the pressure port 28. At the same time the passage 43 is opened to the pressure fluid via the passage 40, thus permitting the fluid to reach the left-hand side of the piston 37 and locking the piston irrespective of further movement of the armature 46. When the solenoid 46 is deenergized the spring 38 cannot move the piston 37 to the left, as there is a substantially higher effort, due to hydraulic pressure present in the valve 27b between the pistons 39 and 37. The only effect resulting from the deenergization of the solenoid is the unbalancing of the piston 39, which moves sharply to the left under the influence of the aforementioned pressure existing between the pistons 39 and 37. In view of the above description and as shown in Figure 4, it should be obvious that the hydraulic pressure force between pistons 39 and 37 is substantially greater than the load exerted by the spring 38. The valve is, therefore, unable to move to the left until such time as pressure is removed by disconnection of the pressure line of the valve, and the valve is then moved to the left under the influence of the spring 38.

The pressure line 33 between the two-way valve 27b and the selector valve 23b has a branch 50 connected with a servo release unit 51b mounted on the sleeve 18b which embraces the jack piston rod 17b.

This unit 51b comprises a locking member 52 having a piston 53 in a cylinder 54 connected with the branch 50 from the pressure line 33 and arranged so that as long as the hydraulic pressure is maintained the piston 53 is urged, against a spring 53a, to hold the locking member 52 in a notch in the piston rod 17b of the jack, thus locking the piston rod 17b relatively to the sleeve 18b on which the servo release unit 51b is mounted; but, when the pressure is cut off or fails, the spring 53a causes the locking member 52 to be withdrawn from the notch, thus freeing the jack piston rod 17b relatively to the sleeve 18b.

In series with the micro-switch 26b is the hand-operated switch 49 under the pilot's control, the windings 48 of the solenoid valve 45 only being energized when both switches are closed.

Also connected with the operating rod 12 is another servo system indicated at Figure 2 by 14a, 15a, 17a, . . . identical with that described above, and connected with an independent source of hydraulic pressure. This second system also terminates in a lever arm 19a arranged to actuate the control surface 20, and each servo system is designed to have sufficient power to actuate the control surface 20, if necessary without assistance from the other servo system.

In operation, under normal flying conditions, the electrical switches are open, and the two-way valves 27a, 27b are set to put the selector valves 23a, 23b in fluid communication with the pressure and return lines 30, 31. Since the pressure is "live," the servo release units 51a, 51b engage the jack piston rods 17a, 17b to lock them relatively to their respective sleeves 18a, 18b. Under these conditions, the control surface 20 is actuated by both the jacks simultaneously. For example, movement of the lever 13b in either direction will operate valves 23a and 23b via the operating rod 12, spring boxes 24a and 24b, links 14a and 14b, levers 21a and 21b, and links 22a and 22b. The porting of the valves 23a and 23b is such that the piston rods 17a and 17b are caused to move in the same directional sense as the operating links 14a and 14b. Movement of the jacks is synchronized by synchronous valve selection, and therefore the control surface operating load is shared equally between them.

If, on the one hand, the hydraulic pressure for the servo mechanism 15a, 17a . . . fails, the servo release unit 51a automatically unlocks the jack piston rod 17a from the sleeve 18a, and the jack is thereby isolated mechanically from the control surface 20, which is then actuated by the other servo system 15b, 17b . . . alone, without interference from the deranged system.

If, on the other hand, the jack 15a seizes, e. g. through mechanical failure, the spring box 24a causes the micro-switch 26a to close and the pilot becomes aware by reason of the increase in operating load that trouble has developed. This is because when he moves his control in the chosen direction the valves are opened, but due to seizure the control surface does not move. The pilot continues to move his control until the spindle of the valve 23a or 23b butts in the valve body, and at this point the pilot is made aware of an abutment. He closes the hand-operated switch 49 and completes the circuit to operate the solenoid-operated valve 45, thus shutting off the fluid power to the unserviceable servo system while retaining fluid power assistance from the other system, and causing the solenoid-operated valve 21a to become hydraulically locked. At the same time he increases his effort to free the stoppage. This extra effort operates the spring box 24a or 24b and switch 26a or 26b in the offending unit, thus operating the release unit 51a or 51b and freeing the mechanism.

As an additional or alternative warning to the pilot, a tell-tale light (not shown) may be included in the system and arranged to be lit when either of the spring box micro-switches is closed, so indicating to the pilot that he should be ready to close his hand-operated switch if necessary.

I claim:

1. A power-operated flying control system for an aircraft, comprising a source of fluid pressure, a control surface, a pilot's control, duplicated independent servo means connected on the one hand with the pilot's control and on the other hand releasably with the control surface, and means arranged, in case of emergency to effect the release of one of the servo means and the actuation of the control surface by the other servo means.

2. A power-operated flying control system for an aircraft, comprising a control surface, a pilot's control, duplicated independent servo means each constituted by a hydraulic jack having an independent source of fluid pressure, a linkage connecting the pilot's control with the hydraulic jacks, and for each jack a releasable lock normally held in its locked position by fluid pressure, and arranged to be unlocked and so disconnect the jack from the control surface when the fluid pressure for that jack is cut off or fails.

3. A power-operated flying control system for an aircraft as claimed in claim 2, wherein each independent hydraulic circuit means is provided with a valve operable upon an abnormal load to the servo means to cut off the pressure fluid therefor.

4. A power-operated flying control system for an aircraft as claimed in claim 2, wherein each independent hydraulic circuit means is provided with a two-way solenoid-operated valve controlling the actuation of a second valve, said second valve in turn controlling the supply of pressure fluid thereto and a micro-switch controlling the valve and with the latter being operative upon an abnormal load to the servo means, and there is also provided a switch in series with each of the micro-switches and under the control of the pilot.

5. A power-operated flying control system for an aircraft as claimed in claim 2, wherein each independent hydraulic circuit means is provided with a two-way solenoid-operated valve controlling the actuation of a second valve, said second valve in turn controlling the supply of pressure fluid thereto, a switch for operating said solenoid and a pair of micro-switches for controlling and operating said solenoid when the permissive load is exceeded.

6. A power-operated flying control system for an aircraft as claimed in claim 2, wherein each independent hydraulic circuit means is provided with a valve and a trip mechanism for the mechanical operation of the valve, said trip mechanism being connected with the linkage between the pilot's control and the hydraulic jack, with said valve being operative upon an abnormal load.

WILLIAM GEORGE LISLE.

REFERENCES CITED

The following references are of record in the file of this patent:

UNITED STATES PATENTS

| Number | Name | Date |
| --- | --- | --- |
| 1,955,922 | Lamond | Apr. 24, 1934 |
| 2,019,617 | Maybach | Nov. 5, 1935 |
| 2,186,235 | Brown | Jan. 9, 1940 |
| 2,315,110 | Dornier | Mar. 30, 1943 |
| 2,396,984 | Broadston et al. | Mar. 19, 1946 |

FOREIGN PATENTS

| Number | Country | Date |
| --- | --- | --- |
| 360,458 | Great Britain | Nov. 2, 1931 |